(12) United States Patent
Nakajima

(10) Patent No.: US 8,593,071 B2
(45) Date of Patent: Nov. 26, 2013

(54) DISCHARGE LAMP LIGHTING DEVICE, PROJECTOR, AND DISCHARGE LAMP LIGHTING METHOD

(75) Inventor: Takeshi Nakajima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 79 days.

(21) Appl. No.: 13/438,432

(22) Filed: Apr. 3, 2012

(65) Prior Publication Data

US 2012/0256555 A1    Oct. 11, 2012

(30) Foreign Application Priority Data

Apr. 8, 2011  (JP) ................................. 2011-086097

(51) Int. Cl.
*H05B 41/36*    (2006.01)

(52) U.S. Cl.
USPC ....................................... 315/224; 315/209 R

(58) Field of Classification Search
None
See application file for complete search history.

(56) References Cited

U.S. PATENT DOCUMENTS

| 5,498,933 A * | 3/1996 | Nakamura ..................... 315/205 |
| 5,594,308 A * | 1/1997 | Nuckolls et al. .............. 315/290 |
| 5,872,429 A * | 2/1999 | Xia et al. ....................... 315/194 |
| 2009/0001904 A1 | 1/2009 | Okawa |
| 2010/0134766 A1 | 6/2010 | Takezawa |
| 2010/0165305 A1 | 7/2010 | Takezawa |

FOREIGN PATENT DOCUMENTS

| JP | A-2009-9885 | 1/2009 |
| JP | A-2010-135141 | 6/2010 |
| JP | A-2010-153318 | 7/2010 |

* cited by examiner

*Primary Examiner* — Crystal L Hammond
(74) *Attorney, Agent, or Firm* — Oliff & Berridge, PLC

(57) ABSTRACT

A discharge lamp lighting device includes a voltage pulse applying section adapted to apply a voltage pulse for causing dielectric breakdown between first and second electrodes of a discharge lamp, an alternating-current voltage applying section adapted to apply an alternating-current voltage to the discharge lamp, the alternating-current voltage including a first polarity period in which the first electrode acts as an anode and a second polarity period in which the second electrode acts as the anode, and a control section. The control section controls the voltage pulse applying section to cause the dielectric breakdown, and thereafter controls the alternating-current voltage applying section to apply the alternating-current voltage having the first polarity period longer than the second polarity period to the discharge lamp, and thereafter to apply the alternating-current voltage having the second polarity period longer than the first polarity period to the discharge lamp.

9 Claims, 10 Drawing Sheets

DISCHARGE LAMP LIGHTING DEVICE, PROJECTOR, AND DISCHARGE LAMP LIGHTING METHOD

BACKGROUND

1. Technical Field

The present invention relates to a discharge lamp lighting device, a projector, and a discharge lamp lighting method.

2. Related Art

As a light source of a projector, there is used a discharge lamp such as a high-pressure mercury lamp or a metal halide lamp.

In order to prevent the damage of the electrodes of the discharge lamp, there is disclosed in JP-A-2009-9885 (Document 1) a lighting control device, which applies high-voltage pulses for causing dielectric breakdown between the electrodes of the discharge lamp, and then applies symmetrical alternating current between the electrodes.

As described also in Document 1, the arc discharge occurs after passing through the period of the glow discharge immediately after starting the lighting operation of the discharge lamp. During the glow discharge, the blackening phenomenon that the electrode material (e.g., tungsten) is deposited on a sealed body of the discharge lamp due to sputtering becomes easy to occur. If the blackening phenomenon occurs, the blackened portion absorbs the light to thereby increase the temperature of the discharge lamp, and glass or the like used for the sealed body is melted and then resolidified to thereby cause a devitrification phenomenon to occur. If the devitrification phenomenon occurs, the illuminance of the discharge lamp is degraded, or the sealed body becomes easy to be damaged, and therefore, it is important to prevent the blackening phenomenon from occurring in order to elongate the product life of the discharge lamp.

SUMMARY

An advantage of some aspects of the invention is to provide a discharge lamp lighting device, a projector, and a discharge lamp lighting method each capable of preventing the blackening phenomenon of the discharge lamp due to sputtering.

An aspect of the invention is directed to a discharge lamp lighting device including a voltage pulse applying section adapted to apply a voltage pulse between a first electrode and a second electrode of a discharge lamp including the first electrode and the second electrode, the voltage pulse causing dielectric breakdown between the first electrode and the second electrode, an alternating-current voltage applying section adapted to apply an alternating-current voltage to the discharge lamp, the alternating-current voltage including a first polarity period in which the first electrode acts as an anode and a second polarity period in which the second electrode acts as the anode, and a control section adapted to control the voltage pulse applying section and the alternating-current voltage applying section, wherein the control section performs a voltage pulse applying processing which causes the voltage pulse applying section to apply the voltage pulse between the first electrode and the second electrode (a voltage pulse applying process), a first control processing which causes the alternating-current voltage applying section to apply the alternating-current voltage to the discharge lamp after the voltage pulse applying processing, the alternating-current voltage having a length of the first polarity period longer than a length of the second polarity period (a first control process), and a second control processing which causes the alternating-current voltage applying section to apply the alternating-current voltage to the discharge lamp after the first control processing, the alternating-current voltage having the length of the second polarity period longer than the length of the first polarity period (a second control process).

According to this aspect of the invention, by making a prompt transition in the discharge from the second electrode acting as a cathode from the glow discharge to the arc discharge in the first control processing, and making a prompt transition in the discharge from the first electrode acting as the cathode from the glow discharge to the arc discharge in the second control processing, the period of the glow discharge can be made shorter. Therefore, the discharge lamp lighting device capable of preventing the blackening phenomenon of the discharge lamp due to the sputtering can be realized.

In the discharge lamp lighting device, it is also possible that the control section performs the first control processing and the second control processing so that a ratio of the length of the first polarity period to the length of the second polarity period in the second control processing is higher than a ratio of the length of the second polarity period to the length of the first polarity period in the first control processing.

Thus, the second electrode can promptly be heated in the first control processing, and in the second control processing, the first electrode can be heated while preventing the temperature of the second electrode heated in the first control processing from dropping. Therefore, since both of the first electrode and the second electrode can promptly be heated, the discharge lamp lighting device capable of preventing the blackening phenomenon of the discharge lamp due to the sputtering can be realized.

In the discharge lamp lighting device, it is also possible that in the first control processing and the second control processing, the control section causes the alternating-current voltage applying section apply the alternating-current voltage having a period in which neither the first electrode nor the second electrode acts as the anode between the first polarity period and the second polarity period.

Thus, it is possible to enhance the degree of freedom of independently designing the length of the first polarity period and the length of the second polarity period without varying the period of the alternating-current voltage.

In the discharge lamp lighting device, it is also possible that the control section further performs a third control processing which causes the alternating-current voltage applying section to apply the alternating-current voltage to the discharge lamp after the second control processing, the alternating-current voltage having the length of the first polarity period and the length of the second polarity period equal to each other (a third control process).

Thus, it is possible to prevent one of the electrodes from wearing more than the other of the electrodes.

Another aspect of the invention is directed to a projector including either one of the light emitting devices described above.

According to this aspect of the invention, since the discharge lamp lighting device capable of preventing the blackening phenomenon of the discharge lamp due to the sputtering is included, a projector capable of using the discharge lamp for a long period of time can be realized.

Still another aspect of the invention is directed to a discharge lamp lighting method adapted to light a discharge lamp including a first electrode and a second electrode. The method includes a dielectric breakdown step in which dielectric breakdown is caused between the first electrode and the second electrode, a first step which applies an alternating-current voltage to the discharge lamp after the dielectric breakdown step, the alternating-current voltage having a length of a first polarity period in which the first electrode acts as an anode longer than a length of a second polarity period in which the second electrode acts as the anode, and a second step which applys an alternating-current voltage to the discharge lamp after the first process, the alternating-current voltage having the length of the second polarity period longer than the length of the first polarity period.

According to this aspect of the invention, by making a prompt transition in the discharge from the second electrode acting as a cathode from the glow discharge to the arc discharge in the first step, and making a prompt transition in the discharge from the first electrode acting as the cathode from the glow discharge to the arc discharge in the second step, the period of the glow discharge can be made shorter. Therefore, the discharge lamp lighting method capable of preventing the blackening phenomenon of the discharge lamp due to the sputtering can be realized.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Hereinafter, a preferred embodiment of the invention will be described in detail with reference to the accompanying drawings. It should be noted that the embodiment described below does not unreasonably limit the contents of the invention as set forth in the appended claims. Further, all of the constituents described below are not necessarily essential elements of the invention.

1. Optical System of Projector

Figure 1:
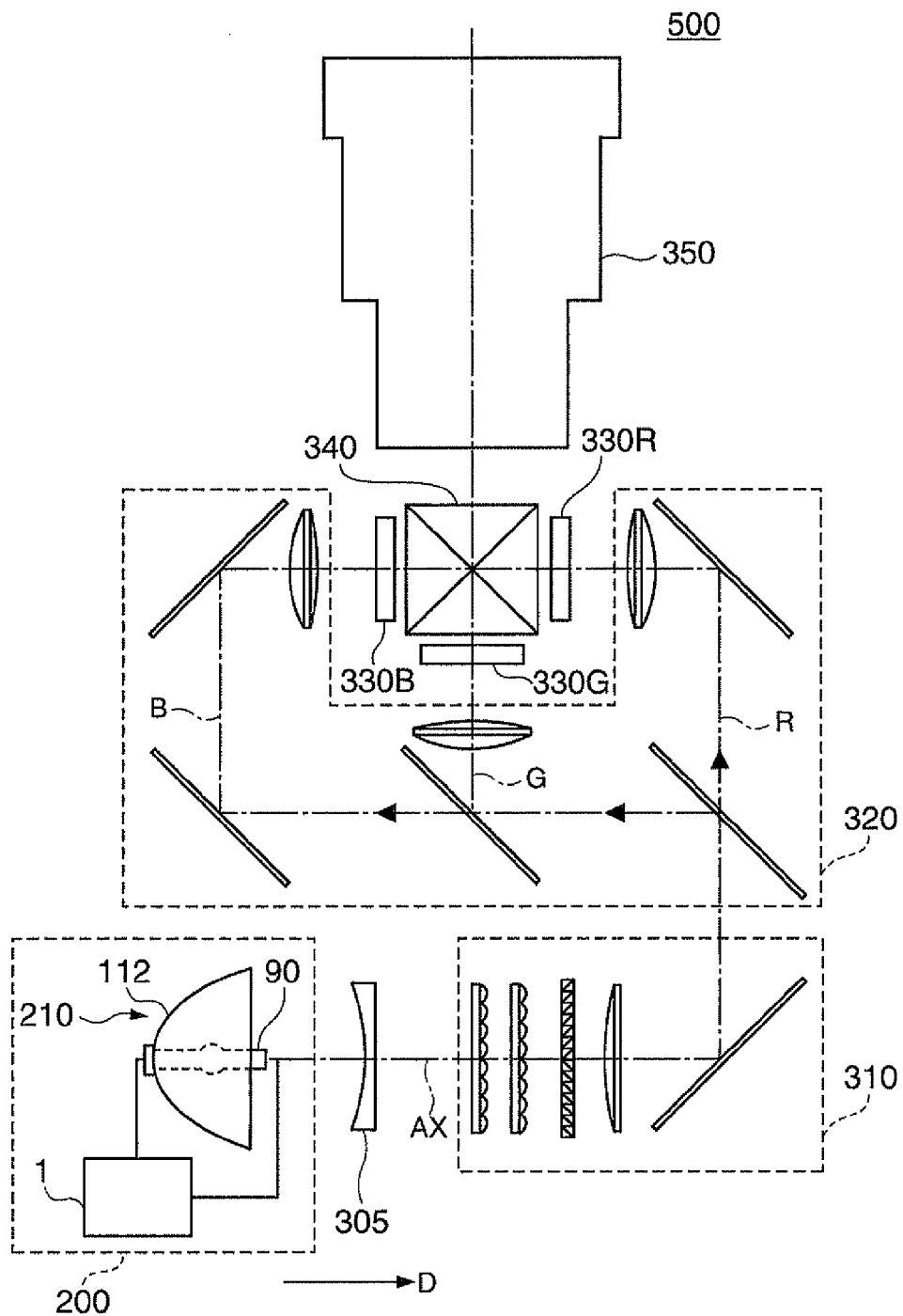
FIG. 1 is an explanatory diagram showing a projector as an embodiment of the invention.

FIG. 1 is an explanatory diagram showing a projector 500 as an embodiment of the invention. The projector 500 includes a light source device 200, a collimating lens 305, an illumination optical system 310, a color separation optical system 320, three liquid crystal light valves 330R, 330G, and 330B, a cross dichroic prism 340, and a projection optical system 350.

The light source device 200 is provided with a light source unit 210 and a discharge lamp lighting device 1. The light source unit 210 includes a main reflecting mirror 112, a sub-reflecting mirror 50, and a discharge lamp 90. The discharge lamp lighting device 1 supplies the discharge lamp 90 with electrical power to thereby light the discharge lamp 90. The main reflecting mirror 112 reflects the light, which is emitted from the discharge lamp 90, in an irradiation direction D. The irradiation direction D is parallel to the optical axis AX. The light from the light source unit 210 passes through the collimating lens 305 and enters the illumination optical system 310. The collimating lens 305 collimates the light from the light source unit 210.

The illumination optical system 310 equalizes the illuminance of the light from the light source device 200 in the liquid crystal light valves 330R, 330G, and 330B. Further, the illumination optical system 310 uniforms the polarization direction of the light from the light source device 200 to one direction. The reason therefor is to effectively utilize the light from the light source device 200 in the liquid crystal light valves 330R, 330G, and 330B. The light adjusted in the illuminance distribution and the polarization direction enters the color separation optical system 320. The color separation optical system 320 separates the incident light into three colored lights of red (R), green (G), and blue (B). The liquid crystal light valves 330R, 330G, and 330B provided with correspondence with the respective colors modulate the three colored lights, respectively. The liquid crystal light valves 330R, 330G, 330B are respectively provided with liquid crystal panels 560R, 560G, 560B and polarization plates disposed on both of the light entrance side and the light exit side of each of the liquid crystal panels 560R, 560G, 560B. The cross dichroic prism 340 combines the three colored lights thus modulated. The combined light enters the projection optical system 350. The projection optical system 350 projects the incident light on a screen not shown. Thus, an image is displayed on the screen.

It should be noted that as a configuration of each of the collimating lens 305, the illumination optical system 310, the color separation optical system 320, the cross dichroic prism 340, and the projection optical system 350, various configurations well known to the public can be adopted.

Figure 2:
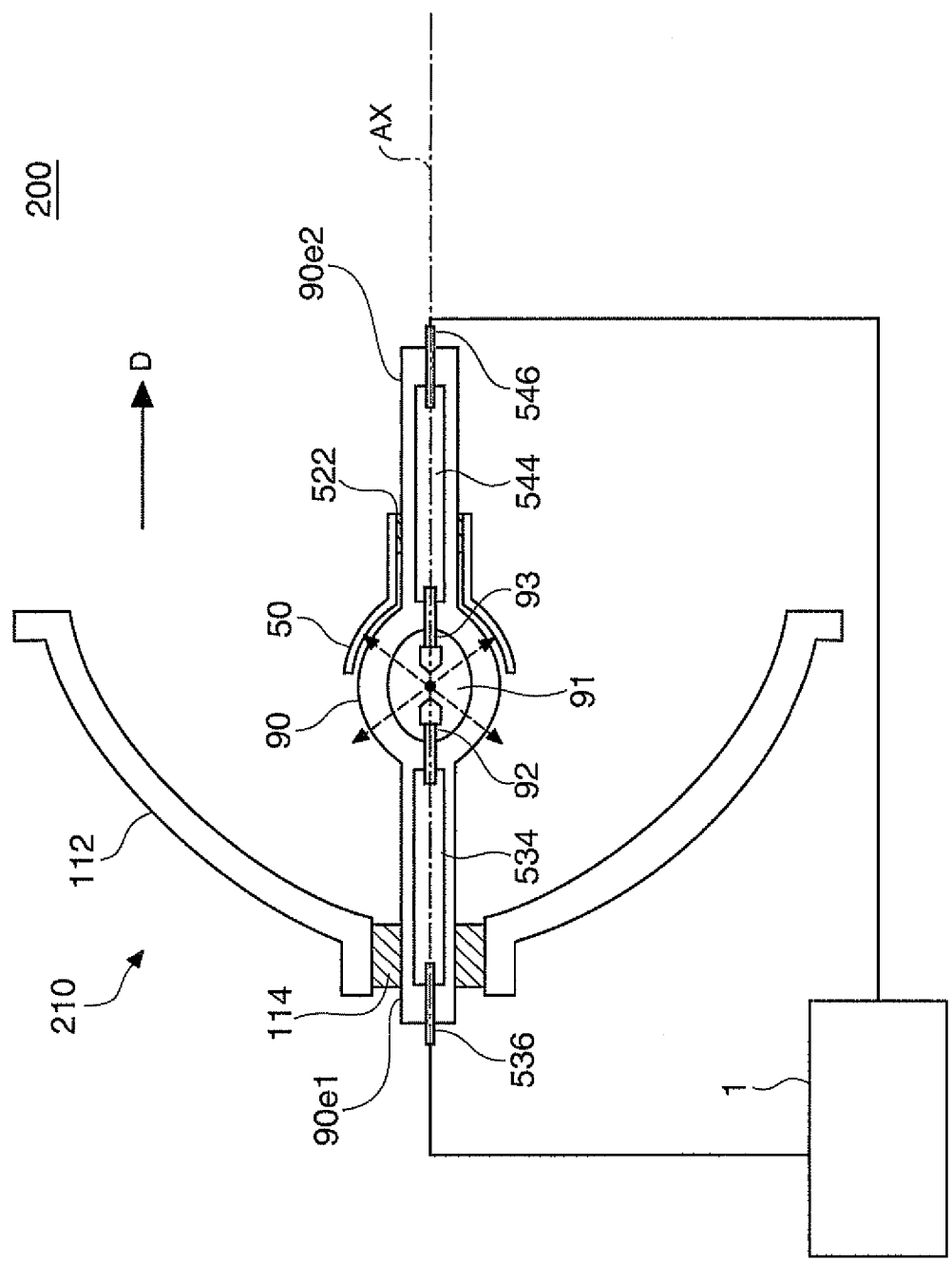
FIG. 2 is an explanatory diagram showing a configuration of a light source device.

FIG. 2 is an explanatory diagram showing a configuration of the light source device 200. The light source device 200 is provided with the light source unit 210 and the discharge lamp lighting device 1. In the drawing a cross-sectional view of the light source unit 210 is shown. The light source unit 210 includes the main reflecting mirror 112, the discharge lamp 90, and the sub-reflecting mirror 50.

The shape of the discharge lamp 90 is a rod-like shape extending from a first end 90e1 to a second end 90e2 along the irradiation direction D. A material of the discharge lamp 90 is a light transmissive material such as quartz glass. A center portion of the discharge lamp 90 bulges to have a spherical shape, and a discharge space 91 is formed therein. Inside the discharge space 91, there is encapsulated a gas as a discharge medium including a noble gas, a metallic halide, and so on.

Further, inside the discharge space 91, a first electrode 92 and a second electrode 93 protrude from the discharge lamp

90. The first electrode 92 is disposed on the first end 90e1 side of the discharge space 91, and the second electrode 93 is disposed on the second end 90e2 side of the discharge space 91. Each of the first electrode 92 and the second electrode 93 has a rod-like shape extending along the optical axis AX. Inside the discharge space 91, electrode tips (also referred to as "discharge ends") of the first electrode 92 and the second electrode 93 are opposed to each other with a predetermined distance. It should be noted that the material of the first electrode 92 and the second electrode 93 is metal such as tungsten.

The first end 90e1 of the discharge lamp 90 is provided with a first terminal 536. The first terminal 536 and the first electrode 92 are electrically connected to each other with a conductive member 534 disposed through the inside of the discharge lamp 90. Similarly, the second end 90e2 of the discharge lamp 90 is provided with a second terminal 546. The second terminal 546 and the second electrode 93 are electrically connected to each other with a conductive member 544 disposed through the inside of the discharge lamp 90. The material of the first terminal 536 and the second terminal 546 is metal such as tungsten. Further, as each of the conductive members 534, 544, molybdenum foil is used, for example.

The first terminal 536 and the second terminal 546 are connected to the discharge lamp lighting device 1. The discharge lamp lighting device 1 supplies the first terminal 536 and the second terminal 546 with an alternating current. As a result, arc discharge is caused between the first electrode 92 and the second electrode 93. The light (discharge light) generated by the arc discharge is emitted from the discharge position in all directions as illustrated with the dashed arrows.

To the first end 90e1 of the discharge lamp 90, there is attached the main reflecting mirror 112 with a fixing member 114. A reflecting surface (a surface facing the discharge lamp 90) of the main reflecting mirror 112 has a spheroidal shape. The main reflecting mirror 112 reflects the discharge light toward the irradiation direction D. It should be noted that as the shape of the reflecting surface of the main reflecting mirror 112, various shapes for reflecting the discharge light toward the irradiation direction D can be adopted besides the spheroidal shape. A paraboloid of revolution, for example, can also be adopted. In this case, the main reflecting mirror 112 can convert the discharge light into the light roughly parallel to the optical axis AX. Therefore, the collimating lens 305 can be eliminated.

On the second end 90e2 side of the discharge lamp 90, there is fixed the sub-reflecting mirror 50 with a fixing member 522. A reflecting surface (a surface facing the discharge lamp 90) of the sub-reflecting mirror 50 has a spherical shape surrounding the second end 90e2 side of the discharge space 91. The sub-reflecting mirror 50 reflects the discharge light toward the main reflecting mirror 112. Thus, the efficiency of the light emitted from the discharge space 91 can be improved.

It should be noted that as a material of the fixing members 114, 522, there can be adopted an arbitrary heat-resistant material (e.g., an inorganic adhesive) resistant to the heat generated by the discharge lamp 90. Further, as the method of fixing the arrangement of the main reflecting mirror 112 and the sub-reflecting mirror with respect to the discharge lamp 90, an arbitrary method can be adopted besides the method of fixing the main reflecting mirror 112 and the sub-reflecting mirror to the discharge lamp 90. For example, it is also possible to fix the discharge lamp 90 and the main reflecting mirror 112 independently to a housing (not shown) of the projector. The same can be applied to the sub-reflecting mirror 50.

Figure 3:
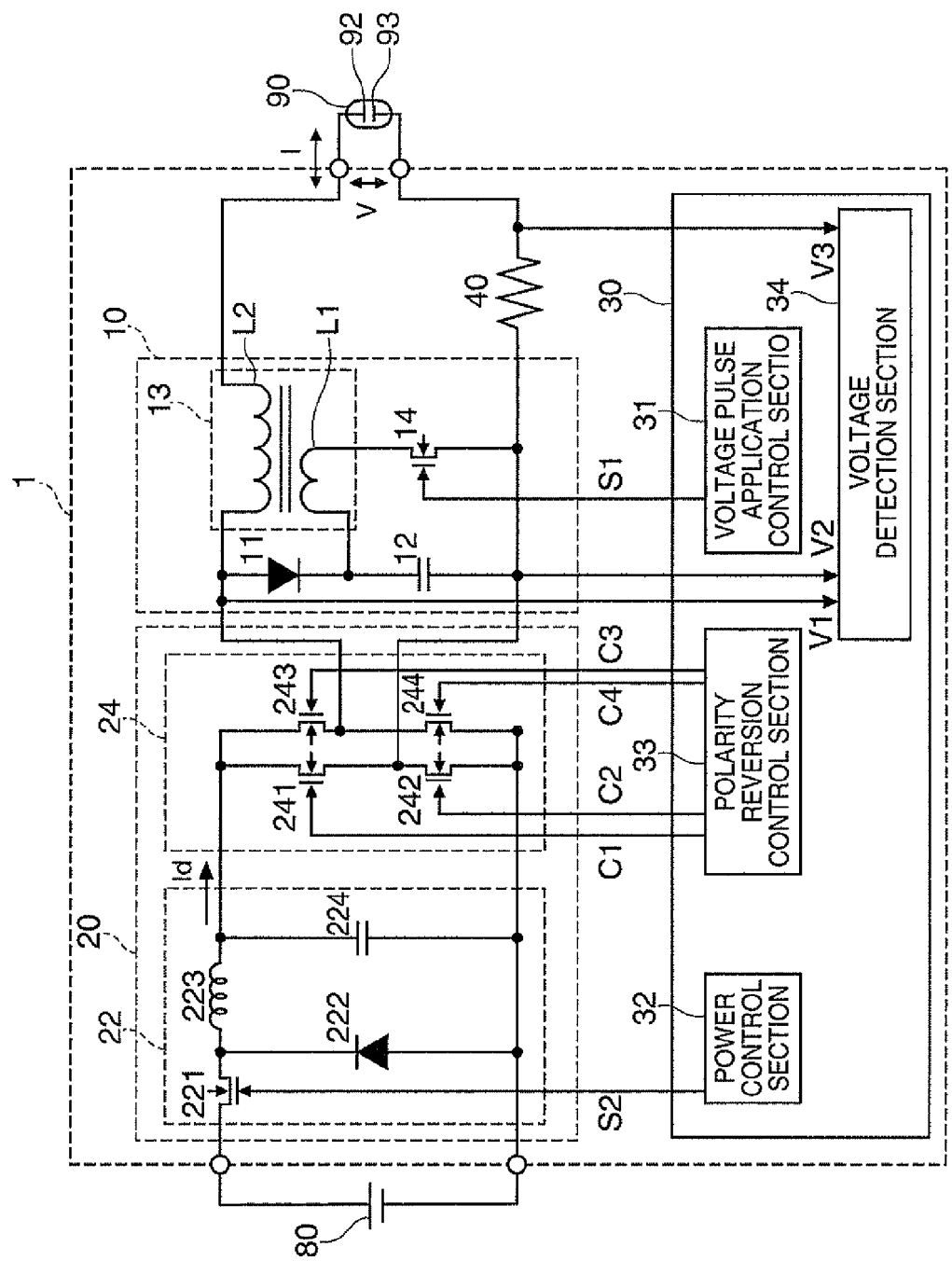
FIG. 3 is a diagram showing an example of a circuit diagram of a discharge lamp lighting device according to the present embodiment.

2. Discharge Lamp Lighting Device and Discharge Lamp Lighting Method According to Present Embodiment 2-1. Configuration of Discharge Lamp Lighting Device FIG. 3 is a diagram showing an example of a circuit diagram of the discharge lamp lighting device 1 according to the present embodiment. The discharge lamp lighting device 1 according to the present embodiment is configured including a voltage pulse applying section 10, an alternating-current voltage applying section 20, and a control section 30.

The voltage pulse applying section 10 applies a voltage pulse, which causes the dielectric breakdown between the first electrode 92 and the second electrode 93 of the discharge lamp 90 including the first electrode 92 and the second electrode 93, between the first electrode 92 and the second electrode 93. Specifically, the voltage pulse applying section 10 supplies a high voltage (a voltage higher than that in the normal lighting of the discharge lamp 90), which is necessary for causing the dielectric breakdown between the electrodes of the discharge lamp 90 to form a discharge path at the beginning of the lighting of the discharge lamp 90, between the electrodes of the discharge lamp 90.

In the example shown in FIG. 3, the voltage pulse applying section 10 is configured including a diode 11, a capacitor 12, a transformer 13, and a switch element 14. The switch element 14 can be formed of, for example, a transistor. In the example shown in FIG. 3, the anode terminal of the diode 11 is arranged to be connected to the first electrode 92 of the discharge lamp 90 via the secondary coil L2 of the transformer 13. Further, the cathode terminal of the diode 11 is arranged to be connected to the second electrode 93 of the discharge lamp 90 via the primary coil L1 of the transformer 13 and the switch element 14, and at the same time, connected to the second electrode 93 of the discharge lamp 90 via the capacitor 12. Further, a voltage pulse application control signal S1 is input to a control terminal of the switch element 14 from the control section 30, and thus the ON/OFF state of the switch element 14 is controlled.

In the voltage pulse applying section 10 shown in FIG. 3, the voltage pulse is generated due to the following operation. Firstly, the switch element is set to the OFF state to thereby store the charge to the capacitor 12 via the diode 11. Then, the switch element is set to the ON state to thereby form a serial resonance circuit with the capacitor 12 and the primary coil L1 of the transformer 13. Thus, the charge stored in the capacitor 12 flows into the primary coil L1 of the transformer 13 to thereby generate the voltage pulse of a high-voltage damped oscillation in the secondary coil L2 of the transformer 13. By applying the voltage pulse, thus generated, between the first electrode 92 and the second electrode 93 of the discharge lamp 90, the dielectric breakdown is caused between the first electrode 92 and the second electrode 93.

The alternating-current voltage applying section 20 applies the alternating-current voltage to the discharge lamp 90, the alternating-current voltage including a first polarity period in which the first electrode 92 becomes the anode and a second polarity period in which the second electrode 93 becomes the anode. In the example shown in FIG. 3, the alternating-current voltage applying section 20 is configured including a power generation circuit 22 and a polarity reversing circuit 24.

The power generation circuit 22 generates drive power to be supplied to the discharge lamp 90. In the example shown in FIG. 3, the power generation circuit 22 is composed of a down chopper circuit taking a direct-current power supply 80 as an input and stepping down the input voltage. Further, the power generation circuit 22 outputs a direct current Id.

In the example shown in FIG. 3, the power generation circuit 22 is configured including a switch element 221, a diode 222, a coil 223, and a capacitor 224. The switch element 221 can be formed of, for example, a transistor. In the example shown in FIG. 3, one end of the switch element 221 is connected to a positive voltage side of the direct-current power supply 80, and the other end thereof is connected to the cathode terminal of the diode 222 and one end of the coil 223. Further, one end of the capacitor 224 is connected to the other end of the coil 223, and the other end of the capacitor 224 is connected to the anode terminal of the diode 222 and a negative voltage side of the direct-current power supply 80. The power control signal 52 is input to the control terminal of the switch element 221 from the control section 30 to thereby control the ON/OFF state of the switch element 221. As the power control signal S2, a pulse width modulation (PWM) control signal can be used, for example.

In the power generation circuit 22, when the switch element 221 is set to the ON state, a current flows through the coil 223, and energy is stored in the coil 223. Subsequently, when the switch element 221 is set to the OFF state, the energy stored in the coil 223 is released along the path passing through the capacitor 224 and the diode 222. As a result, the direct current Id corresponding to a proportion of the time during which the switch element 221 is set to the ON state is generated.

The polarity reversing circuit 24 inputs the direct current Id output from the power generation circuit 22, and then reverses the polarity thereof at a predetermined timing to thereby apply the alternating-current voltage between the first electrode 92 and the second electrode of the discharge lamp 90. Further, the polarity reversing circuit 24 generates and output the drive current I as a direct current lasting for the period controlled, or an alternating current with an arbitrary frequency. In the present embodiment, the polarity reversing circuit 24 is formed of an inverter bridge circuit (a full bridge circuit).

In the example shown in FIG. 3, the polarity reversing circuit 24 is configured including four switch elements 241 through 244. The polarity reversing circuit 24 is configured by connecting a serial connection of the switch elements 241 and 242 and a serial connection of the switch elements 243 and 244 in parallel to each other. Polarity reversion control signals C1 through C4 are input to the control terminals of the switch elements 241 through 244 from the control section 30 to thereby control the ON/OFF states of the switch elements 241 through 244, respectively.

The polarity reversing circuit 24 repeats the ON/OFF of the switch elements 241 and 244 and the ON/OFF of the switch elements 242, 243 alternately to thereby alternately reverse the polarity of the direct current Id output from the power generation circuit 22 and thus generate the alternating-current voltage between a common node of the switch elements 241 and 242 and a common node of the switch elements 243 and 244.

Specifically, the control is performed so that when the switch elements 241 and 244 are in the ON state, the switch elements 242 and 243 are set to the OFF state, and when the switch elements 241 and 244 are in the OFF state, the switch elements 242 and 243 are set to the ON state. Therefore, when the switch elements 241 and 244 are in the ON state, there is generated a drive current flowing from one end of the capacitor 224 through the switch element 241, the discharge lamp 90, and the switch element 244 in this order. Further, when the switch elements 242 and 243 are in the ON state, there is generated a drive current I flowing from one end of the capacitor 224 through the switch element 243, the discharge lamp 90, and the switch element 242 in this order.

The control section 30 controls the voltage pulse applying section 10 and the alternating-voltage applying section 20. In the example shown in FIG. 3, the control section 30 is configured including a voltage pulse application control section 31, a power control section 32, and a polarity reversion control section 33.

The voltage pulse application control section 31 outputs the voltage pulse application control signal S1 to the switch element 14 of the voltage pulse applying section 10 to thereby control the voltage pulse applying section 10.

The power control section 32 outputs the power control signal S2 to the switch element 221 of the power generation circuit 22 to thereby control the power generation circuit 22.

The polarity reversion control section 33 outputs the polarity reversion control signals C1 through C4 to the switch elements 241 through 244 of the polarity reversing circuit 24 to thereby control the polarity reversing circuit 24.

It should be noted that it is also possible to configure a part or the whole of the control section 30 with a semiconductor integrated circuit. Further, the control section 30 can also be realized with a separate circuit to perform the control operation described above and various control operations of the processes described later, or can also be arranged to function as a computer with, for example, the central processing unit (CPU) performing a control program stored in a storage section (not shown) to thereby perform the various control operations of these processes.

The discharge lamp lighting device 1 can include a resistor 40 for measuring the current. In the example shown in FIG. 3, the resistor 40 is configured so as to be connected in series to the discharge lamp 90. By measuring the electrical potential difference generated between the both ends of the resistor 40, the drive current I of the discharge lamp 90 can be measured.

The discharge lamp lighting device 1 can also be configured including a voltage detection section 34. In the example shown in FIG. 3, the voltage detection section 34 is configured as a part of the control section 30. Further, the voltage detection section 34 detects the electrical potential V1 of the anode terminal of the diode 11, and the electrical potentials V2, V3 of the both ends of the resistor 40. The drive voltage Via of the discharge lamp 90 can be measured using the difference between the electrical potentials V1, V3. Further, the drive current I of the discharge lamp 90 can be measured using the difference between the electrical potentials V2, V3.

2-2. State of Electrode in Period from Glow Discharge to Arc Discharge

Figure 4:
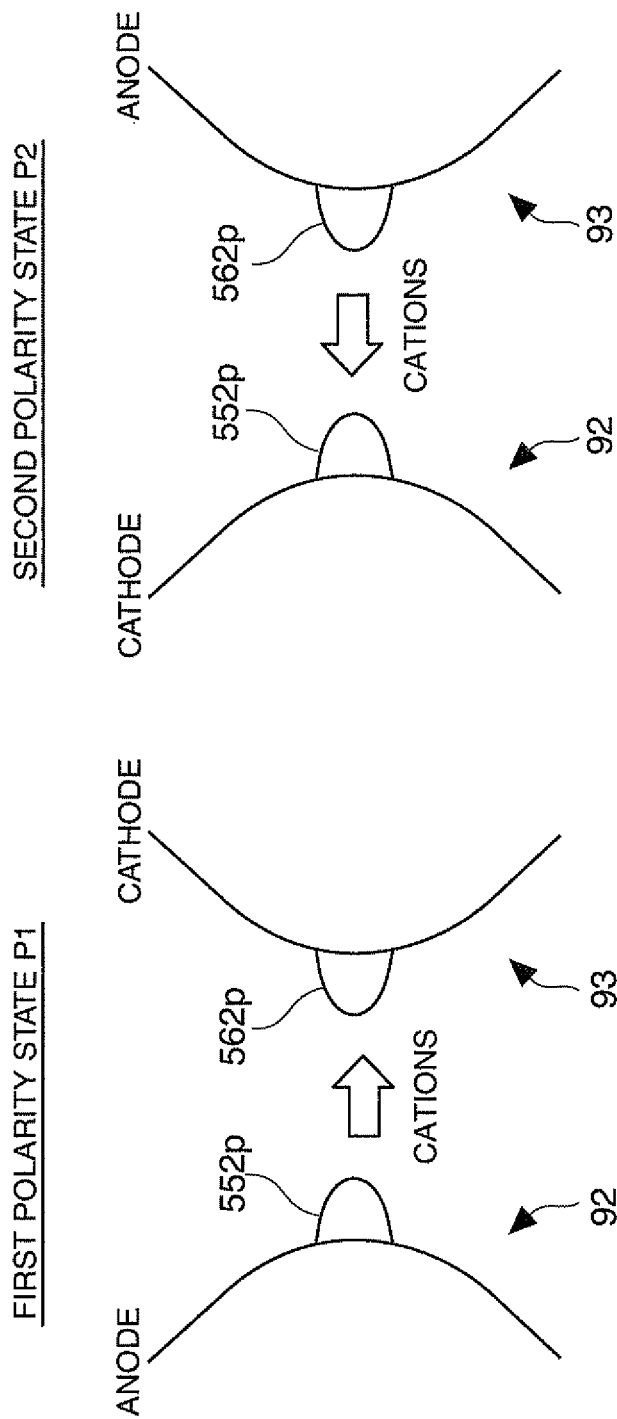
FIG. 4A is a diagram for explaining a first polarity state in which a first electrode is set to an anode.
FIG. 4B is a diagram for explaining a second polarity state in which a second electrode is set to an anode.

FIG. 4A is a diagram for explaining the first polarity state P1 in which the first electrode 92 is set to the anode, and FIG. 4B is a diagram for explaining the second polarity state P2 in which the second electrode 93 is set to the anode. FIGS. 4A and 4B show tip portions of the first electrode 92 and the second electrode 93. The tip portion of the first electrode 92 is provided with a projection 552p, and the tip portion of the second electrode 93 is provided with a projection 562p. The discharge occurs between these projections 552p, 562p. By disposing the projections on the tip portions of the first electrode 92 and the second electrode 93, the shift of the discharge position (the arc position) in each of the first electrode 92 and the second electrode 93 can be suppressed compared to the case without the projections. It should be noted that such projections can also be omitted.

FIG. 4A shows the first polarity state P1 in which the first electrode 92 acts as the anode, and the second electrode 93 acts as the cathode. In the first polarity state P1 after the dielectric breakdown is caused between the first electrode 92 and the second electrode 93 by the voltage pulse applying section 10, cations (e.g., metal ions included in the gas as a discharge medium encapsulated in the discharge lamp 90) migrate from the first electrode 92 (the anode) to the second electrode 93 (the cathode) due to the glow discharge, and collide with the tip of the second electrode 93 (the cathode). Due to the collision of the cations, there occurs sputtering in which the material (e.g., tungsten) of the second electrode 93 (the cathode) is partially chipped off. Further, the collision of the cations causes heat, and the temperature of the tip of the second electrode 93 (the cathode) rises. The temperature of the second electrode 93 (the cathode) rises, and the thermal electron emission from the second electrode 93 (the cathode) starts to thereby make a transition from the glow discharge to the arc discharge.

FIG. 4B shows the second polarity state P2 in which the second electrode 93 acts as the anode, and the first electrode 92 acts as the cathode. In the second polarity state P2 after the dielectric breakdown is caused between the first electrode 92 and the second electrode 93 by the voltage pulse applying section 10, cations migrate from the second electrode 93 (the anode) to the first electrode 92 (the cathode) due to the glow discharge, and collide with the tip of the first electrode 92 (the cathode). Due to the collision of the cations, there occurs sputtering in which the material of the first electrode 92 (the cathode) is partially chipped off. Further, the collision of the cations causes heat, and the temperature of the tip of the first electrode 92 (the cathode) rises. The temperature of the first electrode (the cathode) rises, and the thermal electron emission from the first electrode 92 (the cathode) starts to thereby make a transition from the glow discharge to the arc discharge.

Figure 5:
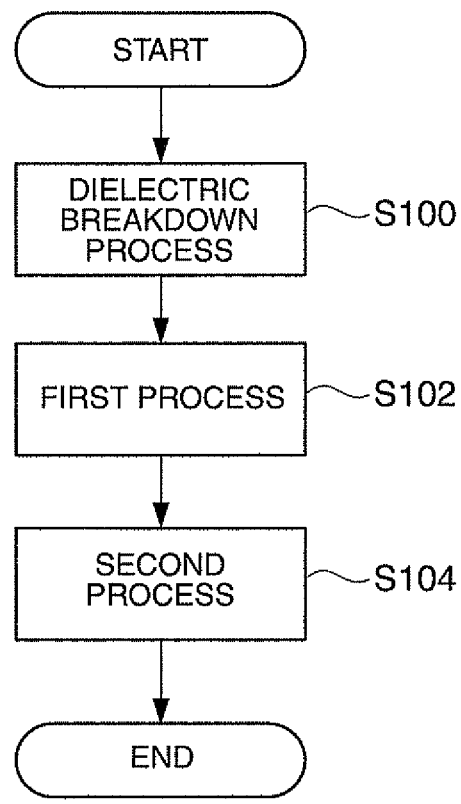
FIG. 5 is a flowchart for explaining a discharge lamp lighting method according to the present embodiment.

2-3. Discharge Lamp Lighting Method and Control Example of Discharge Lamp Lighting Device FIG. 5 is a flowchart for explaining a discharge lamp lighting method according to the present embodiment.

The discharge lamp lighting method according to the present embodiment is a discharge lamp lighting method for lighting the discharge lamp 90 including the first electrode 92 and the second electrode 93, and includes a dielectric breakdown process (step S100) for causing the dielectric breakdown between the first electrode 92 and the second electrode 93, a first process (step S102) performed after the dielectric breakdown process (step S100) and for applying an alternating-current voltage to the discharge lamp 90, the alternating-current voltage having the first polarity period in which the first electrode 92 acts as the anode longer than the second polarity period in which the second electrode 93 acts as the anode, and a second process (step S104) performed after the first process (step S102) and for applying an alternating-current voltage to the discharge lamp 90, the alternating-current voltage having the second polarity period longer than the first polarity period.

Hereinafter, a control example of the discharge lamp lighting device 1 for realizing the discharge lamp lighting method according to the present embodiment using the discharge lamp lighting device 1 will be explained.

Figures 6A, 6B:
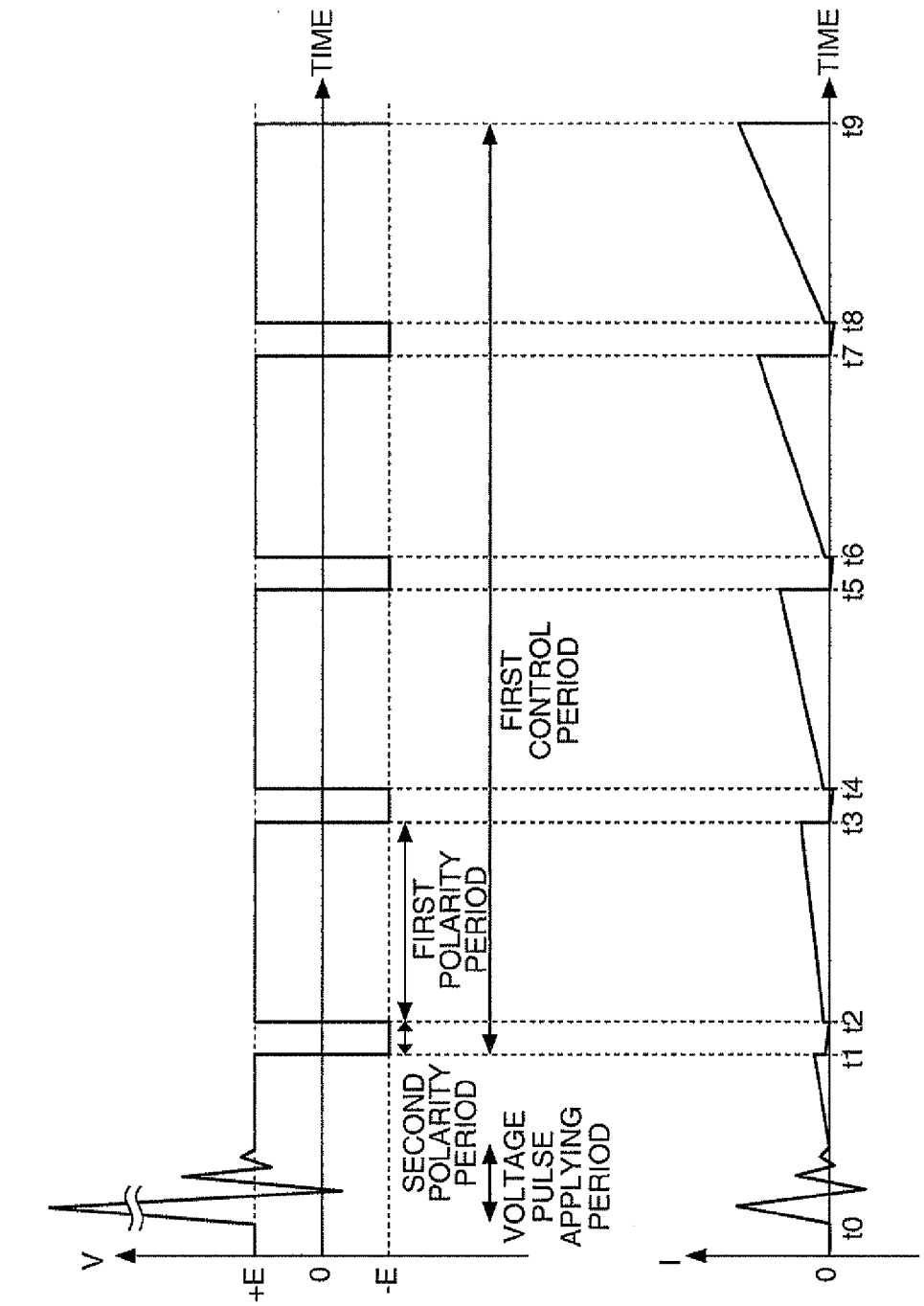
FIG. 6A is a timing chart of a voltage applied between a first electrode and a second electrode.
FIG. 6B is a timing chart of a drive current.

FIG. 6A is a timing chart of the voltage V applied between the first electrode 92 and the second electrode 93, and FIG. 6B is a timing chart of the drive current I. The horizontal axis of FIG. 6A represents time, and the vertical axis thereof represents the voltage V applied between the first electrode 92 and the second electrode 93. The horizontal axis of FIG. 6B represents time, and the vertical axis thereof represents the drive current I. Further, in FIGS. 6A and 6B, it is assumed that the period in which a voltage pulse applying process described later is performed is a voltage pulse applying period, and the period in which a first control process described later is performed is a first control process period.

As shown in the flowchart shown in FIG. 5, in the discharge lamp lighting method according to the present embodiment, firstly, the dielectric breakdown process (step S100) is performed. In the discharge lamp lighting device 1, the control section 30 performs the voltage pulse applying process for applying a voltage pulse between the first electrode 92 and the second electrode 93 using the voltage pulse applying section 10.

In the voltage pulse applying process, the control section 30 firstly sets the switch element 241 and the switch element 244 to the OFF state and the switch element 242 and the switch element 243 to the ON state using the polarity reversion control section 33, and sets the switch element 14 to the OFF state using the voltage pulse application control section 31. Thus, the charge is stored in the capacitor 12. Subsequently, the control section 30 set the switch element 14 to the ON state at the time point t0 in FIG. 6A using the voltage pulse application control section 31. Thus, the voltage pulse with high voltage shown in the voltage pulse applying period in FIG. 6A is applied between the first electrode 92 and the second electrode 93. Thus, the dielectric breakdown is caused between the first electrode 92 and the second electrode 93.

As expressed in the flowchart shown in FIG. 5, in the discharge lamp lighting method according to the present embodiment, the first process (step S102) for applying the alternating-current voltage having the first polarity period in which the first electrode 92 acts as the anode longer than the second polarity period in which the second electrode 93 acts as the anode is performed after the dielectric breakdown process (step S100). In the discharge lamp lighting device 1, the control section 30 performs the voltage pulse applying process, and then performs the first control process of applying the alternating-current voltage having the first polarity period longer than the second polarity period to the discharge lamp 90 using the alternating-current voltage applying section 20.

In the first polarity period, the control section 30 set the switch element 241 and the switch element 244 to the OFF state and the switch element 242 and the switch element 243 to the ON state using the polarity reversion control section 33 in the state of controlling the valve of the output voltage of the power generation circuit 22 to be the constant value of E using the power control section 32. In the second polarity period, the control section 30 set the switch element 241 and the switch element 244 to the ON state and the switch element 242 and the switch element 243 to the OFF state using the polarity reversion control section 33 in the state of controlling the value of the output voltage of the power generation circuit 22 to be the constant value of E using the power control section 32. By the polarity reversion control section 33 controlling the timing of switching the state of each of the switch elements 241 through 244, it is possible to apply the alternating-current voltage having the first polarity period longer than the second polarity period to the discharge lamp 90 using the alternating-current voltage applying section 20.

In the example shown in FIG. 6A, the period from the time point t1 to the time point t2, the period from the time point t3 to the time point t4, the period from the time point t5 to the time point t6, and the period from the time point t7 to the time point t8 correspond to the second polarity period, and the period from the time point t2 to the time point t3, the period from the time point t4 to the time point t5, the period from the time point t6 to the time point t7, and the period from the time point t8 to the time point t9 correspond to the first polarity period.

Further, in the example shown in FIG. 6A, the length of the first polarity period is roughly four times of the length of the second polarity period. It should be noted that the length of the first polarity period and the length of the second polarity period can experimentally be determined in accordance with the specification of the discharge lamp 90.

As shown in FIG. 6B, the direction of the drive current I is reversed between the first polarity period and the second polarity period. In the example shown in FIG. 6B, in both the first and second polarity periods, the absolute value of the drive current I increases with time. This is because in the discharge lamp lighting device 1 according to the present embodiment, the drive current I varies behind the variation in the voltage V due to the influence of the secondary coil L2 of the transformer 13.

Further, as shown in FIG. 6B, the later the first polarity period is, the greater the maximum value of the absolute value of the drive current I in the first polarity period is. As described in the section of "2-2. State Of Electrode In Period From Glow Discharge To Arc Discharge," in the first polarity period, since the temperature of the second electrode 93 rises, and the emission of the thermal electrons from the second electrode 93 starts, the drive current I increases.

In contrast, as shown in FIG. 6B, since the length of the second polarity period is short, the maximum value of the absolute value of the drive current I in the second polarity period does not dramatically vary.

In other words, in the first control process, the control of actively heating the second electrode 93 is performed to thereby make a prompt transition in the discharge from the second electrode 93 from the glow discharge to the arc discharge. Further, since the length of the second polarity period is short, a harmful influence of the sputtering is small.

Figures 7A, 7B:
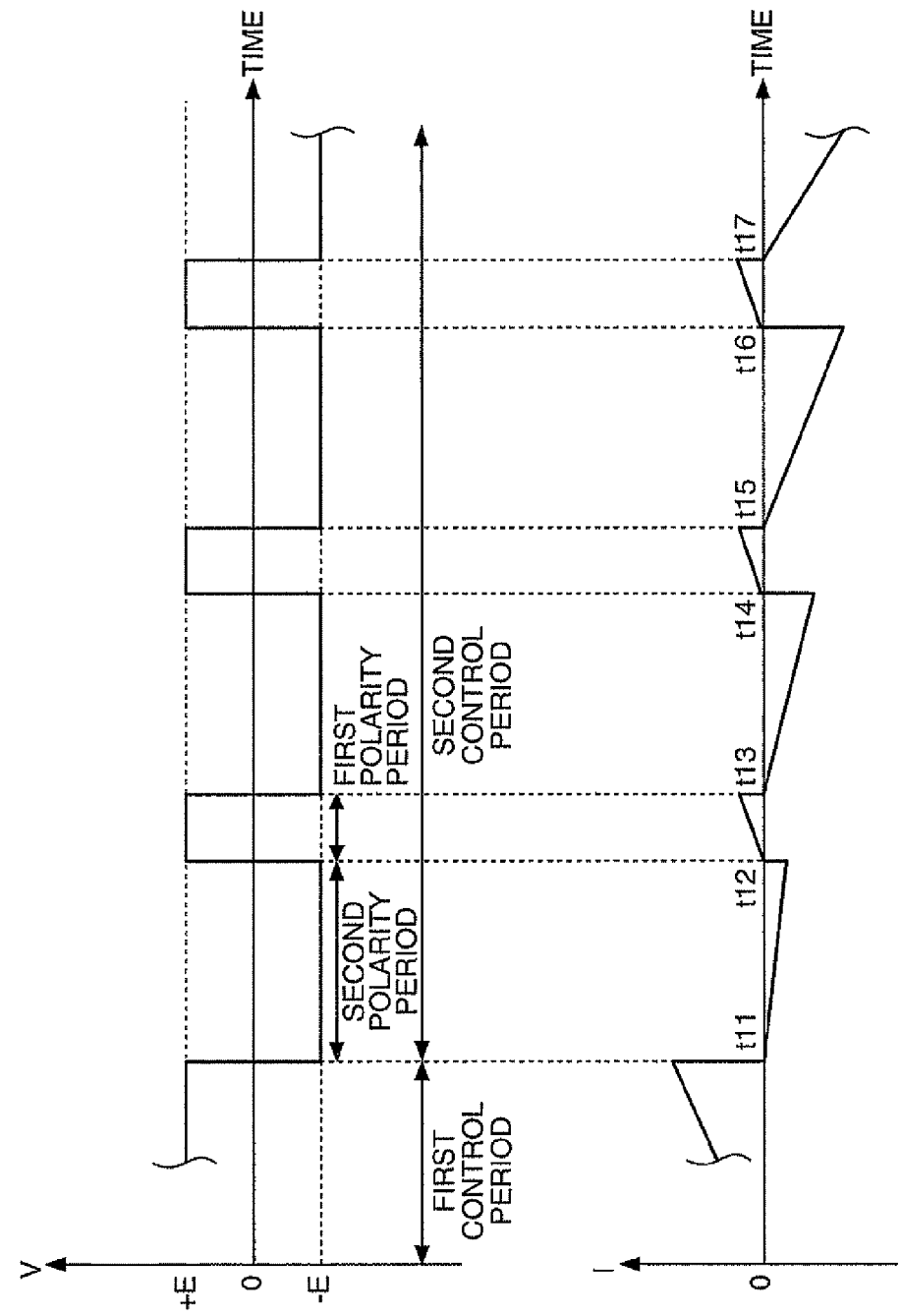
FIG. 7A is a timing chart of the voltage applied between the first electrode and the second electrode subsequent to the timing chart shown in FIG. 6A.
FIG. 7B is a timing chart of the drive current subsequent to the timing chart shown in FIG. 6B.

FIG. 7A is a timing chart of the voltage V applied between the first electrode 92 and the second electrode 93 subsequent to the timing chart shown in FIG. 6A, and FIG. 7B is a timing chart of the drive current I subsequent to the timing chart shown in FIG. 6B. The horizontal axis of FIG. 7A represents time, and the vertical axis thereof represents the voltage V applied between the first electrode 92 and the second electrode 93. The horizontal axis of FIG. 7B represents time, and the vertical axis thereof represents the drive current I. Further, in FIGS. 7A and 7B, it is assumed that the period during which a second control process described later is performed is a second control process period.

As expressed in the flowchart shown in FIG. 5, in the discharge lamp lighting method according to the present embodiment, the second process (step S104) for applying the alternating-current voltage having the second polarity period longer than the first polarity period is performed after the first process (step S102). In the discharge lamp lighting device 1, the control section 30 performs the first control process, and then performs the second control process of applying the alternating-current voltage having the second polarity period longer than the first polarity period to the discharge lamp 90 using the alternating-current voltage applying section 20.

In the discharge lamp lighting device 1 according to the present embodiment, by the polarity reversion control section 33 controlling the timing of switching the state of each of the switch elements 241 through 244, it is possible to apply the alternating-current voltage having the second polarity period with a length greater than the length of the first polarity period to the discharge lamp 90 using the alternating-current voltage applying section 20.

In the example shown in FIG. 7A, the period from the time point t11 to the time point t12, the period from the time point t13 to the time point t14, and the period from the time point t15 to the time point t16 correspond to the second polarity period, and the period from the time point t12 to the time point t13, the period from the time point t14 to the time point t15, and the period from the time point t16 to the time point t17 correspond to the first polarity period.

Further, in the example shown in FIG. 7A, the length of the second polarity period is roughly three times of the length of the first polarity period. It should be noted that the length of the first polarity period and the length of the second polarity period can experimentally be determined in accordance with the specification of the discharge lamp 90.

As shown in FIG. 7B, the later the second polarity period is, the greater the maximum value of the absolute value of the drive current I in the second polarity period is. As described in the section of "2-2. State Of Electrode In Period From Glow Discharge To Arc Discharge," in the second polarity period, since the temperature of the first electrode 92 rises, and the emission of the thermal electrons from the first electrode 92 starts, the drive current I increases.

In contrast, as shown in FIG. 7B, since the length of the first polarity period is short, the maximum value of the absolute value of the drive current I in the first polarity period does not dramatically vary.

In other words, in the second control process, the control of actively heating the first electrode 92 is performed to thereby make a prompt transition in the discharge from the first electrode 92 from the glow discharge to the arc discharge.

According to the discharge lamp lighting device 1 related to the present embodiment, by making a prompt transition in the discharge from the second electrode 93 acting as the cathode from the glow discharge to the arc discharge in the first control process, and making a prompt transition in the discharge from the first electrode 92 acting as the cathode from the glow discharge to the arc discharge in the second control process, the period of the glow discharge can be made shorter compared to the case of applying the symmetrical alternating-current voltage between the first electrode 92 and the second electrode 93. Therefore, the discharge lamp lighting device capable of preventing the blackening phenomenon of the discharge lamp 90 due to the sputtering can be realized.

Further, according to the discharge lamp lighting method related to the present embodiment, by making a prompt transition in the discharge from the second electrode 93 acting as the cathode from the glow discharge to the arc discharge in the first process, and making a prompt transition in the discharge from the first electrode 92 acting as the cathode from the glow discharge to the arc discharge in the second process, the period of the glow discharge can be made shorter. Therefore, the discharge lamp lighting method capable of preventing the blackening phenomenon of the discharge lamp due to the sputtering can be realized.

It should be noted that it is preferable that the electrode more easily heated out of the electrodes of the discharge lamp 90 is set to the second electrode 93. In the case of, for example, the light source device 200 shown in FIG. 2, the electrode on the side far from the main reflecting mirror has a smaller substantive heat capacity compared to the electrode on the side near to the main reflecting mirror 112, and is therefore easier to heat. Therefore, also in the present embodiment, the electrode on the side near to the main reflecting mirror 112 is set to the first electrode 92, and the electrode on the side far from the main reflecting mirror 112 is set to the second electrode 93. By heating the electrode easier to heat in the first process, it is possible to make a prompter transition to the arc discharge.

In the discharge lamp lighting method according to the present embodiment, it is also possible to perform the first process (the step S102) and the second process (the step S104) so that the ratio of the length of the first polarity period to the length of the second polarity period in the second process (the step S104) becomes higher than the ratio of the length of the second polarity period to the length of the first polarity period in the first process (the step S102). In the discharge lamp lighting device 1 according to the present embodiment, it is also possible for the control section to perform the first control process and the second control process so that the ratio of the length of the first polarity period to the length of the second polarity period in the second control process becomes higher than the ratio of the length of the second polarity period to the length of the first polarity period in the first control process.

In the example shown in FIGS. 6B and 7B, it is arranged that the ratio of the length of the first polarity period to the length of the second polarity period in the second control process is 1/3, and the ratio of the length of the second polarity period to the length of the first polarity period in the first control process is 1/4.

By the control section 30 performing such control, the second electrode 93 can promptly be heated in the first control process, and in the second control process, the first electrode 92 can be heated while preventing the temperature of the second electrode 93 heated in the first control process from dropping. Therefore, since both of the first electrode 92 and the second electrode can promptly be heated, the discharge lamp lighting device capable of preventing the blackening phenomenon of the discharge lamp due to the sputtering can be realized.

In the discharge lamp lighting method according to the present embodiment, it is also possible to further perform a third process of applying an alternating-current voltage with the length of the first polarity period and the length of the second polarity period equal to each other to the discharge lamp after the second process (the step S104). In the discharge lamp lighting device 1 according to the present embodiment, it is also possible for the control section 30 to further perform a third control process of making the alternating-current voltage applying section 20 apply an alternating-current voltage with the length of the first polarity period and the length of the second polarity period equal to each other to the discharge lamp 90.

Figures 8A, 8B:
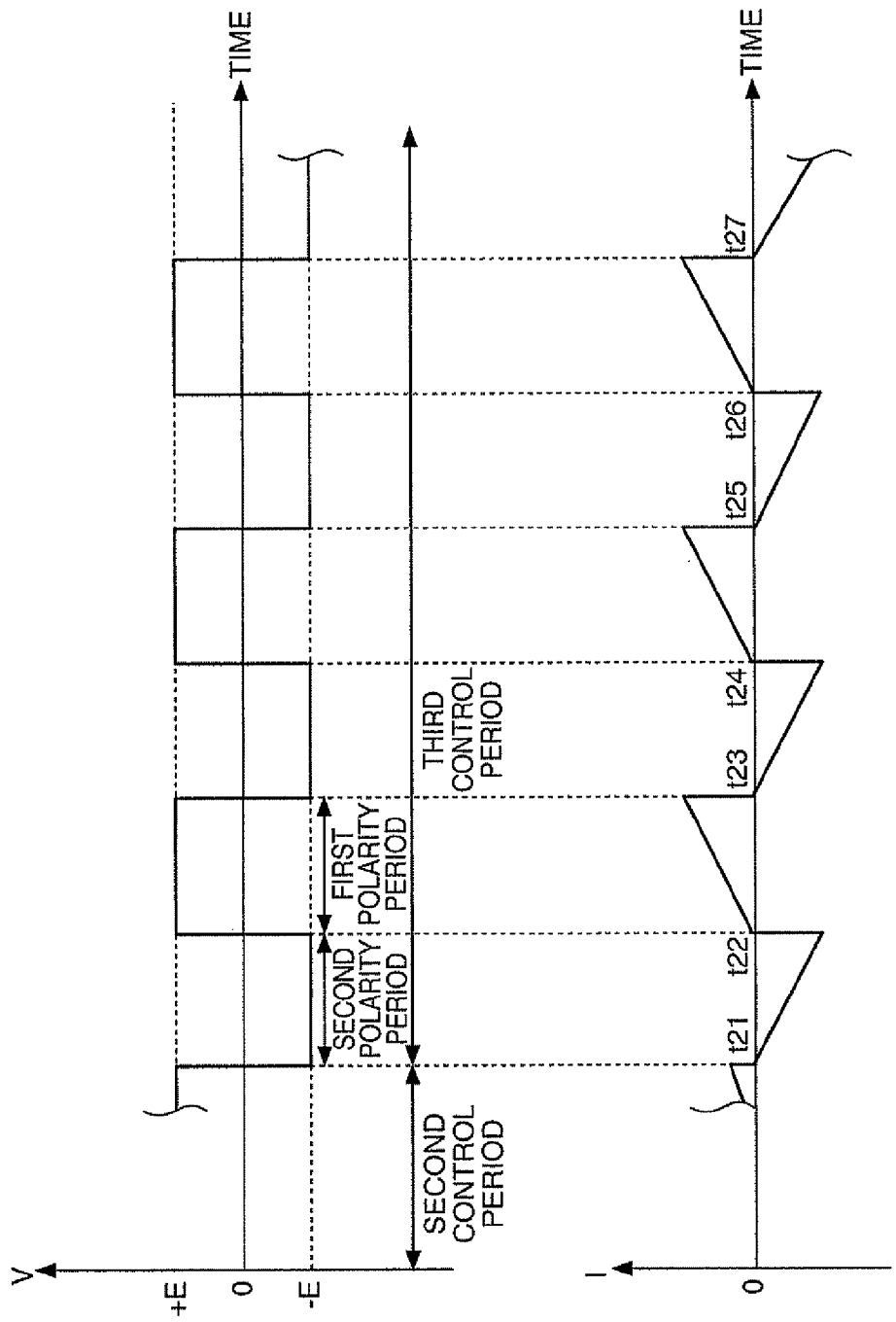
FIG. 8A is a timing chart of the voltage applied between the first electrode and the second electrode subsequent to the timing chart shown in FIG. 7A.
FIG. 8B is a timing chart of the drive current subsequent to the timing chart shown in FIG. 7B.

FIG. 8A is a timing chart of the voltage V applied between the first electrode 92 and the second electrode 93 subsequent to the timing chart shown in FIG. 7A, and FIG. 8B is a timing chart of the drive current subsequent to the timing chart shown in FIG. 7B. The horizontal axis of FIG. 8A represents time, and the vertical axis thereof represents the voltage V applied between the first electrode 92 and the second electrode 93. The horizontal axis of FIG. 8B represents time, and the vertical axis thereof represents the drive current I.

In the discharge lamp lighting device 1 according to the present embodiment, by the polarity reversion control section 33 controlling the timing of switching the state of each of the switch elements 241 through 244, it is possible to apply the alternating-current voltage having the length of the second polarity period and the length of the first polarity period equal to each other to the discharge lamp 90 using the alternating-current voltage applying section 20.

In the example shown in FIG. 8A, the period from the time point t21 to the time point t22, the period from the time point t23 to the time point t24, and the period from the time point t25 to the time point t26 correspond to the second polarity period, and the period from the time point t22 to the time point t23, the period from the time point t24 to the time point t25, and the period from the time point t26 to the time point t27 correspond to the first polarity period. It should be noted that the length of the first polarity period and the length of the second polarity period can experimentally be determined in accordance with the specification of the discharge lamp 90.

As shown in FIG. 8B, the maximum value of the absolute value of the drive current I in the first polarity period and the maximum value of the absolute value of the drive current I in the second polarity period are arranged to be in the same range.

By the control section 30 performing the third control process, it is possible to prevent one of the electrodes of the discharge lamp 90 from wearing more than the other of the electrodes.

2-4. Modified Example of Discharge Lamp Lighting Method and Control Example of Discharge Lamp Lighting Device In the discharge lamp lighting method according to the present embodiment, an alternating-current voltage having a period in which neither the first electrode 92 nor the second electrode 93 becomes the anode between the first polarity period and the second polarity period can also be applied in the first process (the step S102) and the second process (the step S104). In the discharge lamp lighting device 1 according to the present embodiment, it is also possible for the control section 30 to make the alternating-current voltage applying section 20 apply an alternating-current voltage in the first control process and the second control process, the alternating-current voltage having a period in which neither the first electrode 92 nor the second electrode 93 becomes the anode between the first polarity period and the second polarity period.

Figure 9:
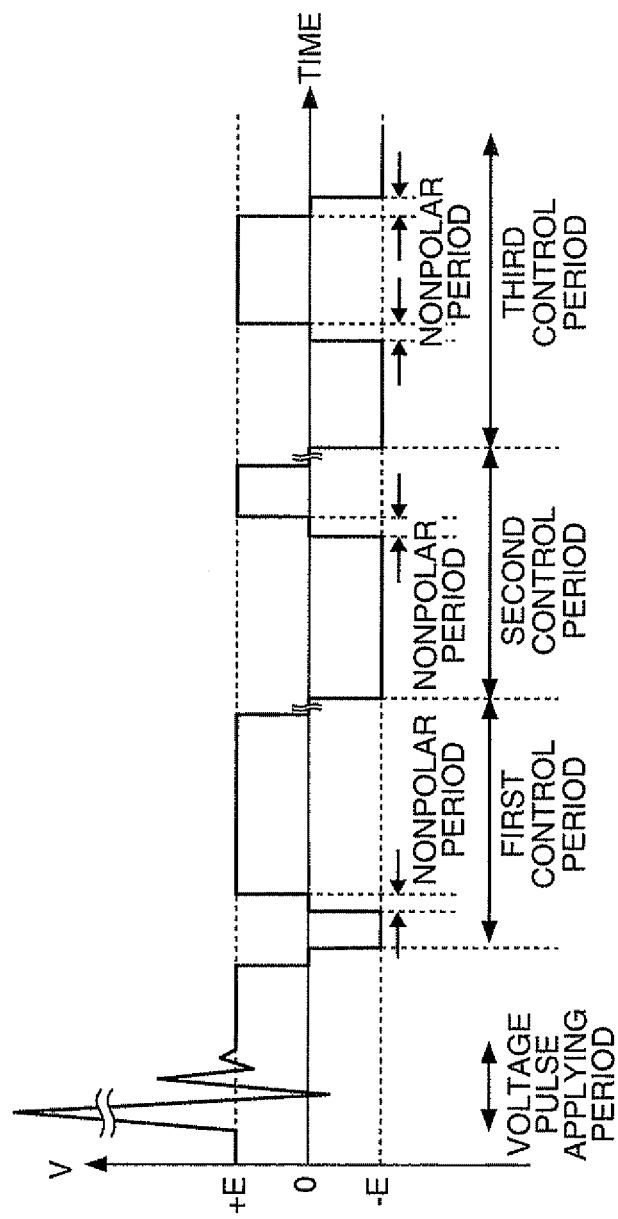
FIG. 9 is a timing chart of the voltage applied between the first electrode and the second electrode in a modified example.

FIG. 9 is a timing chart of the voltage V applied between the first electrode 92 and the second electrode 93 in a modified example. The horizontal axis of FIG. 9 represents time, and the vertical axis thereof represents the voltage V applied between the first electrode 92 and the second electrode 93.

In the example shown in FIG. 9, the nonpolar period in which neither the first electrode nor the second electrode becomes the anode is provided between the second polarity period and the first polarity period following the second polarity period in the first control period and the second control period. It should be noted that although not shown in FIG. 9, the nonpolar period in which neither the first electrode nor the second electrode becomes the anode is also provided between the first polarity period and the second polarity period following the first polarity period in the first control period and the second control period. Further, as shown in FIG. 9, it is also possible for the control section 30 to control the alternating-current voltage applying section 20 so as to provide the nonpolar period between the first polarity period and the second polarity period also in the third control period.

In the nonpolar period, the control section 30 sets the switch elements 241 through 244 to the OFF state using the polarity reversion control section 33.

By the control section 30 controlling the alternating-current voltage applying section 20 so as to provide the nonpolar period, it is possible to enhance the degree of freedom of independently designing the length of the first polarity period and the length of the second polarity period without varying the period of the alternating-current voltage. Further, in the polarity reversing circuit 24, the risk that a through current passing through the switch element 241 and the switch element 242 and a through current passing through the switch element 243 and the switch element 244 flow can be reduced.

3. Circuit Configuration of Projector

Figure 10:
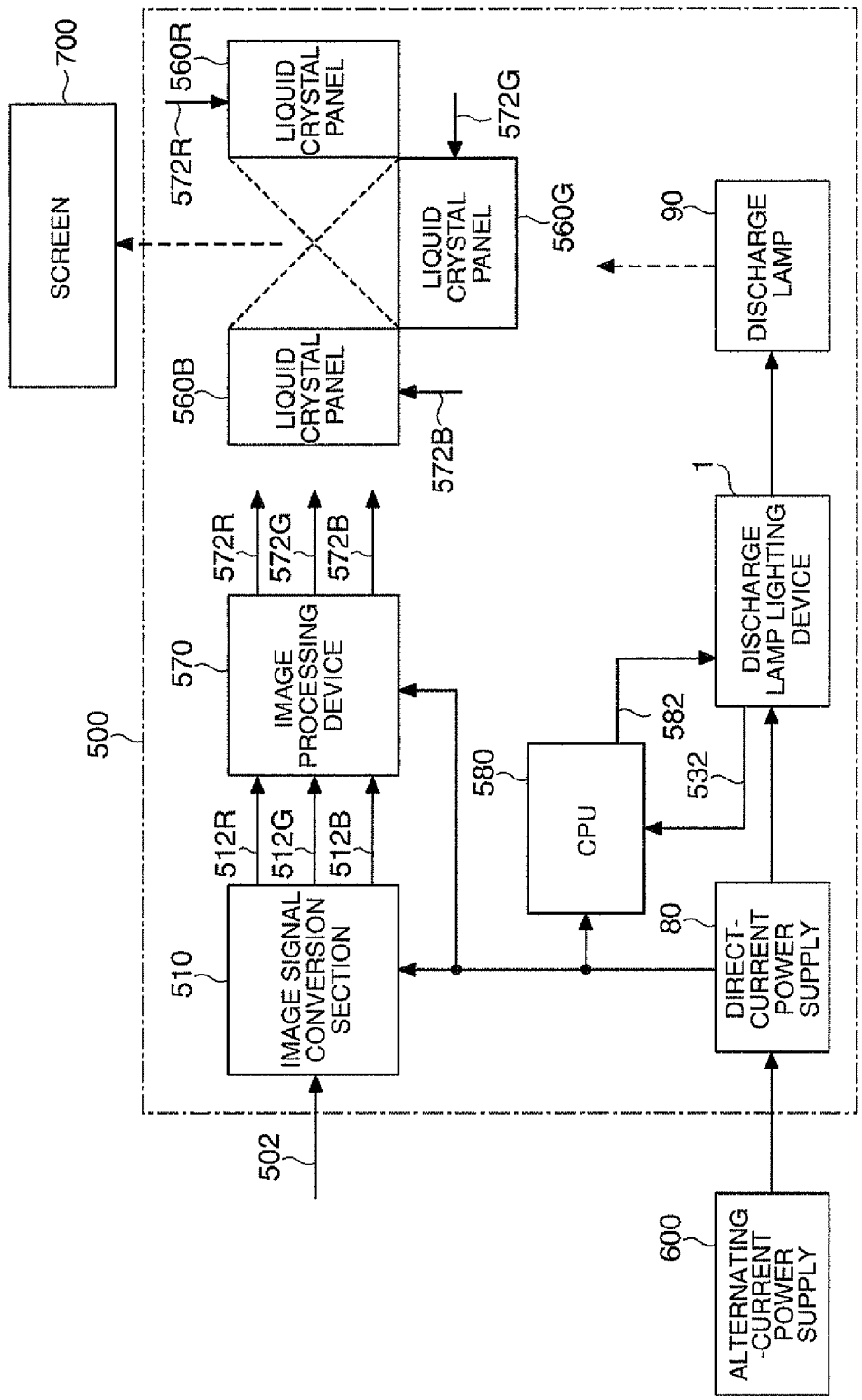
FIG. 10 is a diagram showing an example of a circuit configuration of a projector according to the present embodiment.

FIG. 10 is a diagram showing an example of a circuit configuration of a projector according to the present embodiment. The projector 500 includes an image signal conversion section 510, a direct current power supply device 80, liquid crystal panels 560R, 560G, and 560B, and an image processing device 570 besides the optical system explained above.

The image signal conversion section 510 converts an image signal 502 (e.g., a luminance/color-difference signal or an analog RGB signal) input from the outside into a digital RGB signal of a predetermined word length to thereby generate image signals 512R, 512G, and 512B, and then supplies them to the image processing device 570.

The image processing device 570 performs image processing on each of the three image signals 512R, 512G, and 512B, and outputs drive signals 572R, 572G, and 572B for respectively driving the liquid crystal panels 560R, 560G, and 560B.

The direct-current power supply device 520 converts the alternating-current voltage supplied from an external alternating-current power supply 600 into a constant direct-current voltage, and supplies the direct-current voltage to the image signal conversion section 510 and the image processing device 570 both disposed on the secondary side of a transformer (not shown, but included in the direct-current power supply device 520), and the discharge lamp lighting device 1 disposed on the primary side of the transformer.

The liquid crystal panels 560R, 560G, and 560B modulate the luminance of the colored lights entering the liquid crystal panels via the optical system explained above in accordance with the drive signals 572R, 572G, and 572B, respectively.

The central processing unit (CPU) 580 controls the operation of the projector from the beginning of lighting to the extinction. It is also possible to output, for example, a lighting command and an extinction command to the discharge lamp lighting device 1 via a communication signal 582. Further, it is also possible for the CPU 580 to receive information regarding whether or not the discharge lamp 90 lights from the discharge lamp lighting device 1 via a communication signal 532.

The discharge lamp lighting device 1 generates a high voltage between the electrodes of the discharge lamp at the time of startup to thereby cause dielectric breakdown for forming the discharge path, and then supplies a drive current I for the discharge lamp 90 to maintain the discharge. The details of the discharge lamp lighting device are as described in the section of "2. Discharge Lamp Lighting Device And Discharge Lamp Lighting Method According To Present Embodiment."

Since the projector 500 configured as described above includes the discharge lamp lighting device 1 capable of preventing the blackening phenomenon of the discharge lamp due to the sputtering, a projector capable of using the discharge lamp 90 for a long period of time can be realized.

Although in the embodiment described above the projector using the three liquid crystal panels is explained as an example, the invention is not limited thereto, but can be applied to the projector using one, two, four, or more liquid crystal panels.

Although in the embodiment described above the transmissive projector is explained as an example, the invention is not limited thereto, but can also be applied to a reflective projector. It should be noted here that "transmissive" denotes that the electro-optic modulation device as the light modulation section is a type of transmitting light such as a transmissive liquid crystal panel, and "reflective" denotes that the electro-optic modulation device as the light modulation section is a type of reflecting light such as a reflective liquid crystal panel or a micromirror light modulation device. As the micromirror light modulation device, for example, a digital micromirror device (DMD, a trademark of Texas Instruments) can be used. Also in the case in which the invention is applied to the reflective projector, substantially the same advantages as in the case with the transmissive projector can be obtained.

The invention can be applied to a front projection projector for performing projection from the side of observing the projection image, and also to a rear projection projector for performing projection from the side opposite to the side of observing the projection image.

It should be noted that the invention is not limited to the embodiment described above, but can be put into practice with various modification within the scope or the spirit of the invention.

The invention includes configurations (e.g., configurations having the same function, the same way, and the same result, or configurations having the same object and the same advantages) substantially the same as those described in the embodiment section. Further, the invention includes configurations obtained by replacing a non-essential part of the configuration described in the embodiment section. Further, the invention includes configurations exerting the same functional effects or configurations capable of achieving the same object as the configuration described in the embodiment section. Further, the invention includes configurations obtained by adding technologies known to the public to the configuration described in the embodiment section.

The entire disclosure of Japanese Patent Application No. 2011-086097, filed Apr. 8, 2011 is expressly incorporated by reference herein.

What is claimed is:

1. A discharge lamp lighting device comprising:
a voltage pulse applying section adapted to apply a voltage pulse between a first electrode and a second electrode of a discharge lamp, the voltage pulse causing dielectric breakdown between the first electrode and the second electrode;
an alternating-current voltage applying section adapted to apply an alternating-current voltage to the discharge lamp, the alternating-current voltage including a first polarity period in which the first electrode acts as an anode and a second polarity period in which the second electrode acts as the anode; and
a control section adapted to control the voltage pulse applying section and the alternating-current voltage applying section,
wherein the control section performs
a voltage pulse applying processing which causes the voltage pulse applying section to apply the voltage pulse between the first electrode and the second electrode,
a first control processing which causes the alternating-current voltage applying section to apply the alternating-current voltage to the discharge lamp after the voltage pulse applying processing, the alternating-current voltage having a length of the first polarity period longer than a length of the second polarity period, and
a second control processing which causes the alternating-current voltage applying section to apply the alternating-current voltage to the discharge lamp after the first control processing, the alternating-current voltage having the length of the second polarity period longer than the length of the first polarity period.

2. The discharge lamp lighting device according to claim 1, wherein the control section performs the first control processing and the second control processing so that a ratio of the length of the first polarity period to the length of the second polarity period in the second control processing is higher than a ratio of the length of the second polarity period to the length of the first polarity period in the first control processing.

3. The discharge lamp lighting device according to claim 1, wherein in the first control processing and the second control processing, the control section causes the alternating-current voltage applying section apply the alternating-current voltage having a period in which neither the first electrode nor the second electrode acts as the anode between the first polarity period and the second polarity period.

4. The discharge lamp lighting device according to claim 1, wherein the control section further performs a third control processing which causes the alternating-current voltage applying section to apply the alternating-current voltage to the discharge lamp after the second control processing, the alternating-current voltage having the length of the first polarity period and the length of the second polarity period equal to each other.

5. A projector comprising:
the discharge lamp lighting device according to claim 1.

6. A projector comprising:
the discharge lamp lighting device according to claim 2.

7. A projector comprising:
the discharge lamp lighting device according to claim 3.

8. A projector comprising:
the discharge lamp lighting device according to claim 4.

9. A discharge lamp lighting method adapted to light a discharge lamp including a first electrode and a second electrode, comprising the step of:

causing dielectric breakdown between the first electrode and the second electrode;

applying a first alternating-current voltage to the discharge lamp after the dielectric breakdown, the first alternating-current voltage having a length of a first polarity period in which the first electrode acts as an anode longer than a length of a second polarity period in which the second electrode acts as the anode; and applying a second alternating-current voltage to the discharge lamp after applying the first alternating-current to the discharge lamp, the second alternating-current voltage having the length of the second polarity period longer than the length of the first polarity period.

* * * * *